No. 624,468. Patented May 9, 1899.
J. J. FAULKNER.
ACETYLENE GAS APPARATUS.
(Application filed Aug. 4, 1898.)
(No Model.) 2 Sheets—Sheet 1.
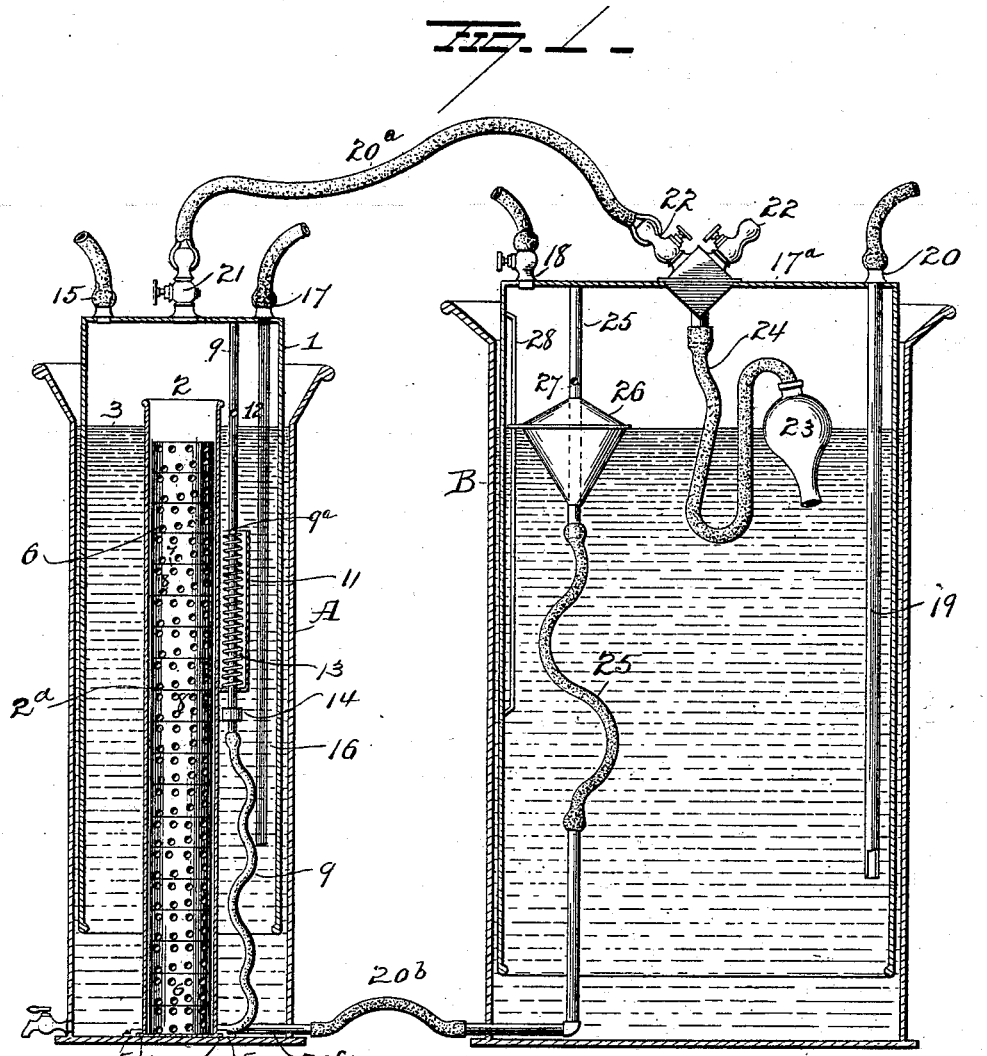
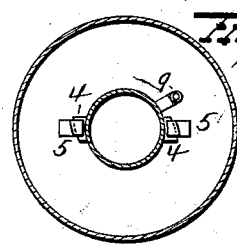
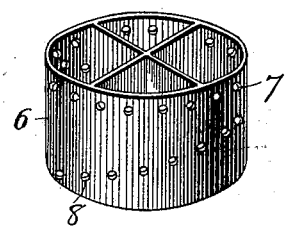
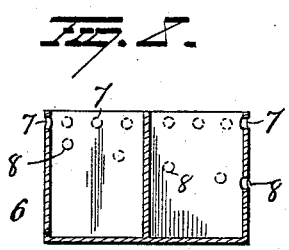
WITNESSES
E. J. Nottingham
G. F. Downing
INVENTOR
J. J. Faulkner
By H. D. Seymour
Attorney

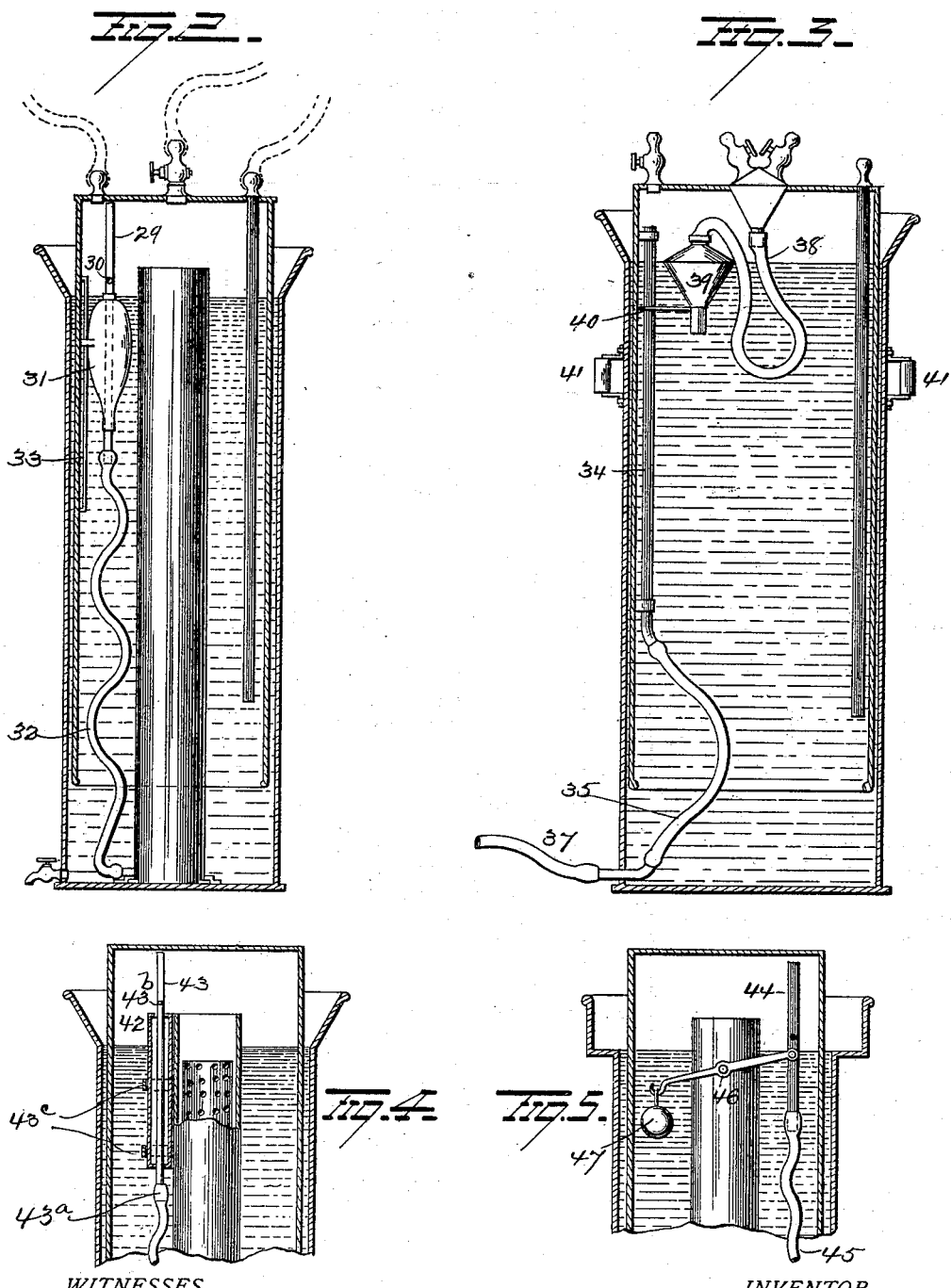

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD GAS MACHINE COMPANY, OF SAME PLACE.

ACETYLENE-GAS APPARATUS.

SPECIFICATION forming part of Letters Patent No. 624,468, dated May 9, 1899.

Application filed August 4, 1898. Serial No. 687,714. (No model.)

*To all whom it may concern:*

Be it known that I, JAMES J. FAULKNER, of Memphis, in the county of Shelby and State of Tennessee, have invented certain new and useful Improvements in Apparatus for Manufacturing Acetylene Gas; and I do hereby declare the following to be a full, clear, and exact description of the invention, such as will enable others skilled in the art to which it appertains to make and use the same.

My invention relates to an improvement in apparatus for manufacturing acetylene gas; and it consists in certain novel features of construction and combinations of parts, as will be hereinafter more fully described, and pointed out in the claims.

In the accompanying drawings, Figure 1 represents a sectional view of my improved apparatus. Fig. 2 is a view, partly in section, of another form of gas-generator. Fig. 3 is a sectional view of another form of gas-receiver. Figs. 4 and 5 are sectional views of further modified forms of gas-generators, and Figs. 6, 7, and 8 are views of details.

A represents an outer cylinder open at its top and provided with a flaring mouth, and 1 is an inner or movable cylinder open at its bottom. Cylinder A is provided centrally with a tube 2, which extends upwardly to a point slightly above water-line 3. The bottom of this tube is provided with diametrically opposite points with lugs or extensions 4 4, adapted to slide under the cleats 5 5, secured to the bottom of cylinder A, whereby said tube is removably supported in its operative position against accidental displacement. The tube 2 can be easily removed when desired by simply turning same sufficiently to remove lugs or extensions 4 4 out of engagement with cleats 5 5. The tube 2 is provided with a series of carbid-receptacles 6, each of a diameter less than the diameter of said tube, and when arranged one above the other, as shown in Fig. 1, a water-circulating space $2^a$ is formed between said receptacles and tube. Each of the receptacles 6 is preferably divided into four compartments and is provided with two series of perforations 7 and 8, the series of perforations 7 being located around the receptacle near its top edge and are for the escape of gas generated in said compartments, while the series of perforations 8 are arranged, beginning at the base and terminating at the top, in step-like or spiral form and are for the admission of water to the calcium carbid or other gas-generating substance contained in the several compartments. By thus arranging the perforations 8 it will be apparent that the carbid in one compartment will be thoroughly saturated with water before the carbid in the next compartment is saturated, and so on until the carbid in the last or fourth compartment of a single receptacle is saturated; or, in other words, when water is first introduced into tube 2 through the medium of the mechanism to be hereinafter described it will enter through the lowest perforation in the bottom receptacle, and as it gradually rises in said tube it will flow through the next perforation of the spiral or step-like series, and so on until the carbid in a sufficient number of compartments shall have been saturated, one after another, to generate an amount of gas necessary to raise the movable cylinder and cut off the water-supply. Water is supplied to tube 2 by a flexible supply-pipe 9, supported within cylinders A and 1 by a sleeve 11, carried by said tube, the lower end of the flexible section of said pipe being connected with a nipple at the opening located at or near the bottom of tube 2, while the upper end of the metallic section of pipe 9 extends above water-line 3 and is provided at a point adjacent to said water-line with a hole or opening 12, which latter is also, when said section is in its normal position, above the water-line. Within the sleeve 11 the upper or metallic section of pipe 9 is encircled by a coil-spring 13, having its seat on the bottom of said sleeve and is adapted to be depressed by a pin $9^a$, carried by said metallic section. When the latter is moved in a downward direction, the upward movement of this metallic section is limited by a collar 14, carried thereon.

Gas may be conveyed from the upper portion of cylinder 1 to a burner (not shown) through outlet-pipe 15. Should an excessive amount of gas be generated, the surplus would be allowed to escape from cylinder 1 through pipe 16 and outlet 17 as soon as said cylinder arrives at an elevation sufficient to bring the lower end of said pipe above water-line 3.

The receiver comprises an outer cylinder B, open at its top and provided with a flaring mouth, and an inner or movable cylinder $17^a$, open at its bottom, and the latter is provided with a discharge-valve 18, to which is connected a flexible hose for the transmission of gas to a burner. (Not shown.) Cylinder $17^a$ is also provided with a gas-escape pipe 19 and outlet 20 for the escape of surplus gas from the receiver. The construction and operation of the gas-escape pipe and outlet are similar to that shown in the generator above described.

Gas is conveyed from the generator to the receiver through the flexible pipe $20^a$, one end of which is connected to a valve 21, carried by the top of movable cylinder 1, and the other end to one of the valves 22, carried by the movable cylinder $17^a$, the remaining valve 22 on cylinder $17^a$ being designed for coupling up another receiver should a larger quantity of gas be required.

Located in the water contained in the receiver is a float 23, which is coupled up to valve 22 by a flexible hose 24, the open end of said float being located below the water-level. The gas as it leaves valve 22 is conducted through hose 24 and escapes through the open end of float 23, and as said open end of the float is submerged in water it will be seen that the gas will be freed during its upward passage through the water of all its impurities.

In addition to the means already described for supplying water to generator-tube 2 I have also provided the gas-receiver with an automatically-operated water-supply pipe 25 for supplying water to said tube. The pipe 25 consists of an upper and a lower section of pipe and an intermediate section of flexible hose, the lower section being in the form of an L, the short arm thereof extending through the side wall of cylinder B, at which point it is connected with a flexible pipe $20^b$, and the latter is connected with a pipe $20^c$, communicating with tube 2 of the generator. The upper section of this pipe 25 is maintained in a vertical position by a float 26, through which a portion of said pipe-section extends, and directly above this float the pipe is provided with an inlet-opening 27 for the passage of water. As the gas passes out of the receiver the movable cylinder $17^a$ will descend, and during its descent its top will come in contact with the upper end of pipe 25 and will force the latter downwardly in the receiver until the opening 27 is submerged, when the water will enter said pipe and be conveyed to tube 2 through the several connections above described. The float during the descent of pipe 25 is prevented from lateral movement by a guide-rod 28, attached to the movable cylinder $17^a$ and to which the said float is loosely connected.

The automatic water-supply pipe illustrated in connection with the gas-generator shown in Fig. 2 consists of an upper section of pipe 29, having an inlet-opening 30 therein, a float 31, and a flexible hose connection 32, the lower end of which latter communicates with the tube 2. The float 31 in this construction is also prevented from moving laterally by a guide-rod 33, attached to the movable cylinder.

In the receiver illustrated in Fig. 3 the water-supply pipe consists of a long section of pipe 34, open at its upper end, and a flexible section of pipe 35, extending from the lower end of section 34 to an outlet-pipe 37. The pipe-section 34 is rigidly fastened to the side wall of the movable cylinder, and when the latter descends the open end of said pipe will be submerged and the water passing therein will be conveyed to tube 2 of a generator. The receiver illustrated in this figure is also provided with a different form of gas-inlet, and it consists of a flexible connection 38 and a funnel-shaped float 39, the open end of which is disposed below the water-level. The float 39 is provided with an outwardly-projecting arm 40, in which is located a hole for the passage of pipe-section 34, through the medium of which the float is prevented from lateral movement. The cylinder B is provided on its exterior with two handles 41, whereby the receiver may be easily moved from place to place as desired. These handles may be located on both the receivers and generators.

In Fig. 4 I have shown a tubular float 42 in which the metallic pipe-section 43 of the water-supply is rigidly secured, the depending end of said section 43 being connected to the upper end of a section of flexible hose $43^a$, while its upper end projects above the water-line and is provided with the usual water-inlet $43^b$, which is also located above the water-line when the float is in its normal position. This float is movably supported in loops $43^c$, carried by tube 2.

In Fig. 5 the water-supply devices comprise a short section of pipe 44, having a water-inlet $44^a$ and a section of flexible hose 45. To the pipe 44 is connected one end of the lever 46, the opposite end of said lever being provided with a weight or counterbalance 47, said lever being pivotally supported on tube 2. In this construction and also in the construction shown in Fig. 4 the water-inlet in pipe will be submerged on the descent of the movable cylinder, as previously described, and as soon as pressure is removed therefrom by the ascent of said cylinder the pipe will return to its normal position and the further entrance of water therein prevented. In this construction of generator I have shown cylinder A as being provided with an enlarged open end, preferably circular in form, whereby the water-holding capacity of said cylinder may be increased, if desired. This form of cylinder can be used in connection with the generators and receivers heretofore described, if desired. The stationary cylinders may also be provided with suitable cocks for drawing off the water contained therein when a refilling is desirable.

The operation of the apparatus is as follows: The desired number of carbid-receptacles 6 are first filled with calcium carbid or other gas-generating substance, after which they are placed within tube 2, one upon the other, as shown in Fig. 1, and water is then poured into cylinder A. When the proper level has been reached, the movable cylinder 1 is then placed in position, and owing to the absence of gas said cylinder will immediately descend and during its descent will contact with and force pipe 9 downwardly. As soon as the water-inlet 12 of said pipe reaches a point below the water-level 3 a continuous stream of water will be supplied to tube 2. When the water reaches and passes into the lowest perforation 8 of the bottom receptacle, the generation of gas will begin, and as the water gradually rises the generation of gas will be increased by reason of the increased saturation of the carbid. As the perforations 8 are arranged in step-like or spiral form, preferably with three or more perforations to each compartment, it will be apparent as the water rises that the carbid in the compartment provided with the lowest perforations of the series will be saturated first, then the carbid in the next adjacent compartment, and so on until the carbid in the compartment provided with the highest or last set of perforations of the series is saturated. Should the water continue to rise in tube 2, the carbid in the receptacle next above will be saturated in the manner above described, and so on until a sufficient amount of gas has been generated to elevate movable cylinder 1 out of engagement with pipe 9. The gas as it is generated in the several receptacles escapes through the perforations 7 into the water-circulating space formed between the interior wall of tube 2 and said receptacles and thence out through the open end of said tube into the movable cylinder, and when the pressure of the gas generated becomes sufficient to overcome the weight of said movable cylinder the latter will then begin its ascent. As soon as movable cylinder 1 ascends the pressure which had been exerted by it on the end of pipe 9 will be removed, and said pipe will then be gradually returned to its normal position by the expansive action of spring 13. When inlet 12 of pipe 9 reaches a point above water-line 3, the flow of water to tube 2 will be stopped and the further generation of gas prevented.

In case a larger supply of gas is desired than the holding capacity of the generator the receiver is employed for holding the additional amount of gas to be generated, said receiver being coupled up to the generator, as shown in Fig. 1. The receiver which I have described and which constitutes a part of my present invention is also provided with a water-supply pipe 25 for furnishing water to tube 2 of the generator, as before explained. This increased supply of water to tube 2 will permit of a larger area of carbid being saturated in a given time and the consequent generation of an increased amount of gas in the same interval of time. The supply-pipe 25 is also forced downwardly into the water contained in the receiver by the fall or descent of movable cylinder 17ª, and when the inlet 27 in said pipe has reached a point below the water-level the water entering therein will be conveyed to tube 2. At the instant gas-pressure in the receiver is sufficient to overcome the weight of movable cylinder 17ª the latter will begin its ascent or upward movement, during which period of movement the free end of supply-pipe 25 will be relieved of downward pressure and said pipe will be returned to its normal position by the action of float 26. As soon as the water-inlet 27 of pipe 25 reaches a point above the water-level the supply of water to tube 2 will be cut off. Instead of discharging the gas directly into the receiver above the water-line I prefer to discharge same below the water-line, which is accomplished by means of the flexible hose 24 and float 23, thus removing all impurities from the gas.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a generator for acetylene gas, the combination with an outer cylinder, open at its top, and an inner cylinder, open at its bottom, of a carbid-tube supported by the outer cylinder, a water-supply pipe provided with a water-inlet and adapted to intermittingly discharge water in the bottom of said carbid-tube on the descent of the movable cylinder and means for automatically returning said pipe to its normal position.

2. In a generator for acetylene gas, the combination with an outer cylinder, open at its top, of an inner cylinder, open at its bottom, of a carbid-tube supported by the outer cylinder, a water-supply pipe provided with a water-inlet adapted to be submerged in the water contained in the inner cylinder by the descent of the movable cylinder whereby water is intermittingly discharged in said tube and a spring for returning said pipe and its inlet above the level of the water for stopping the flow of water to the tube.

3. The combination with two pairs of telescoping cylinders, the movable cylinders of each pair communicating with each other, a carbid-receptacle supported within one pair of said telescopic cylinders and water-supply pipes located within each pair of cylinders, said pipes being in communication with the carbid-tube and adapted to intermittingly discharge water therein by the descent of the respective movable cylinders.

4. The combination with telescopic cylinders, one inverted within the other, and a carbid-receptacle located within said cylinders, of a pipe vertically movable independently of the movable cylinder and adapted to project into the water in said cylinders and communicating with the carbid-receptacle therein, said pipe having a hole near one end and adapted to be engaged and moved by said movable cylinder to control the entrance of water through said hole in the pipe and the passage of water to the carbid-receptacle, substantially as set forth.

5. The combination with a generator containing a carbid-receptacle and adapted to contain water, and a receiver adapted to contain water, of devices in the generator and devices located in the receiver, both sets of devices constructed and adapted to feed water contained in the generator and receiver respectively independently to the carbid-receptacle, substantially as set forth.

6. The combination with a receiver comprising telescopic cylinders containing water, and a valve carried by one of said cylinders for controlling the inlet of gas to said receiver, of a flexible pipe connected to said valve and a hollow float having an open end connected to said pipe and having its open end immersed in the water in the receiver.

In testimony whereof I have signed this specification in the presence of two subscribing witnesses.

JAMES J. FAULKNER.

Witnesses:
T. J. BRADEN,
E. C. WRIGHT.